Patented Mar. 23, 1948

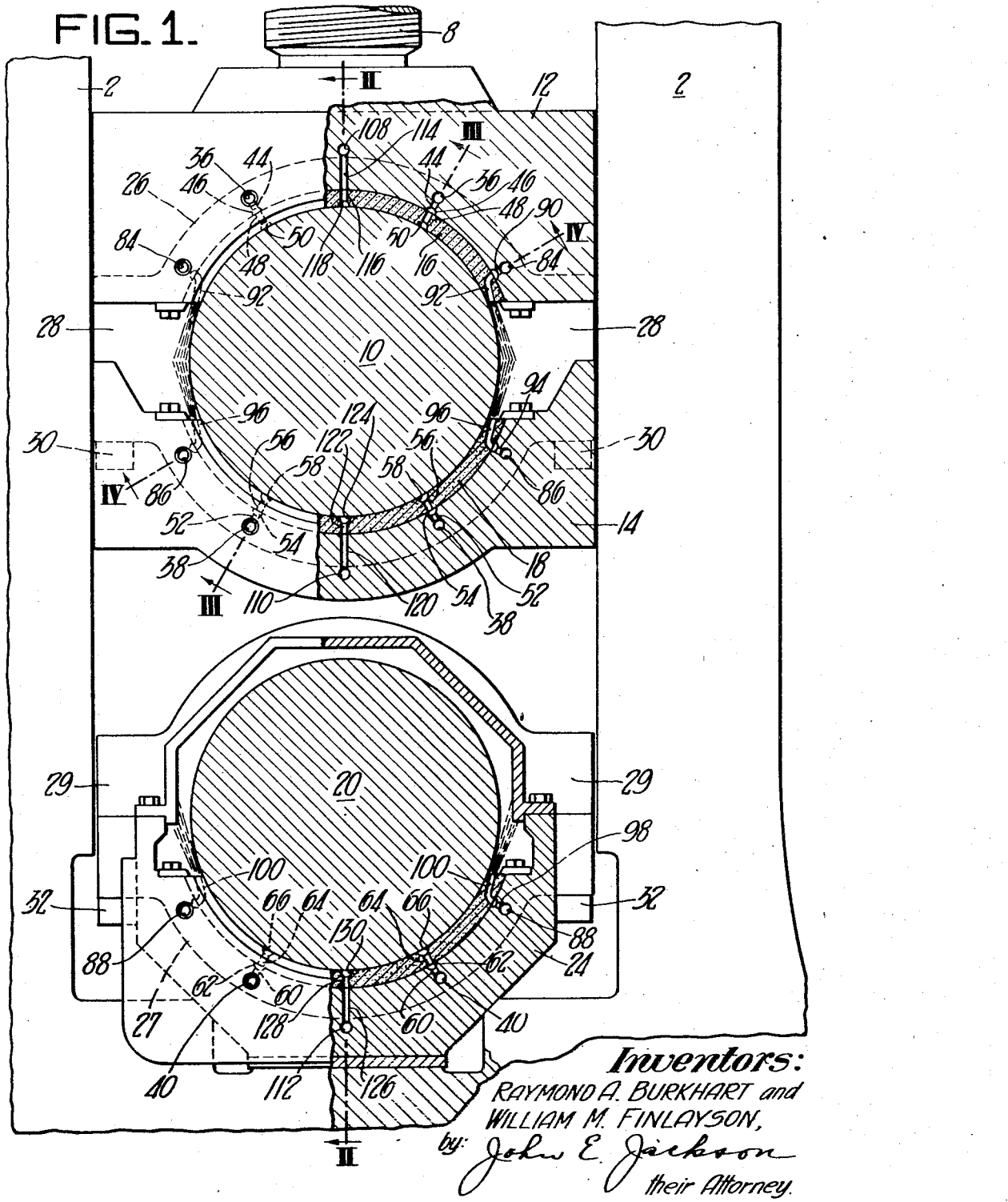

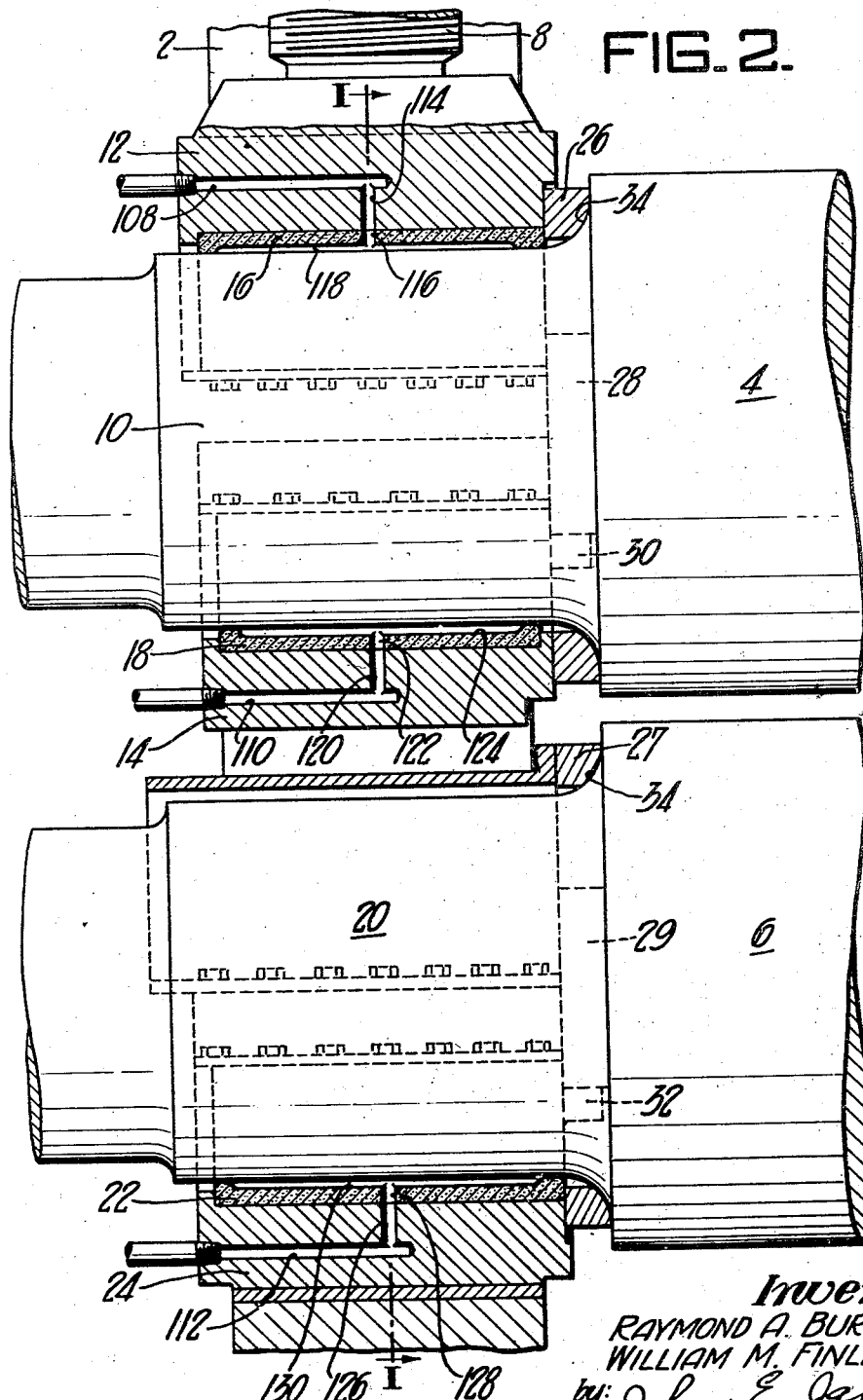

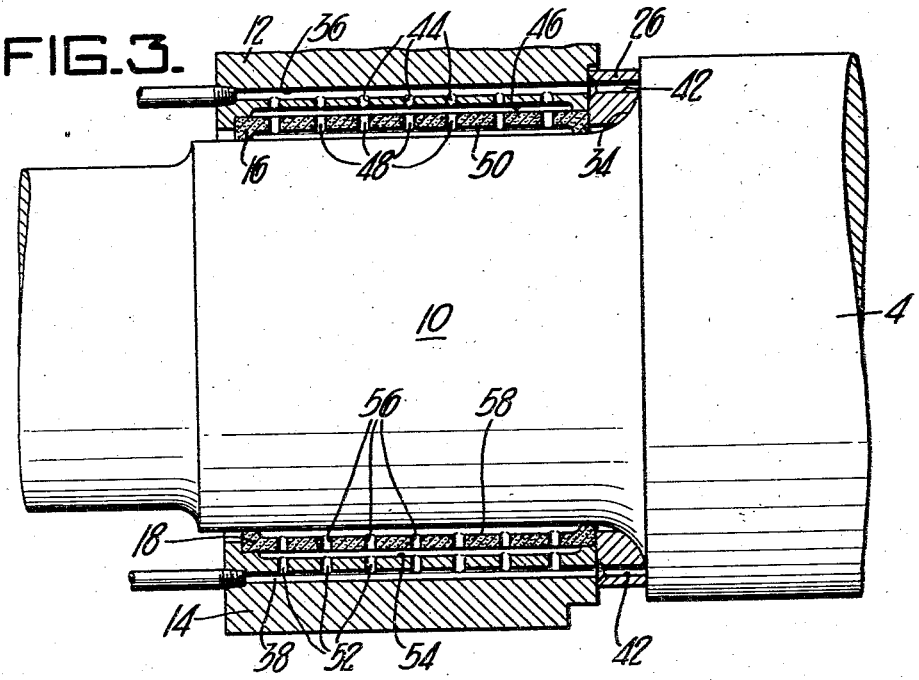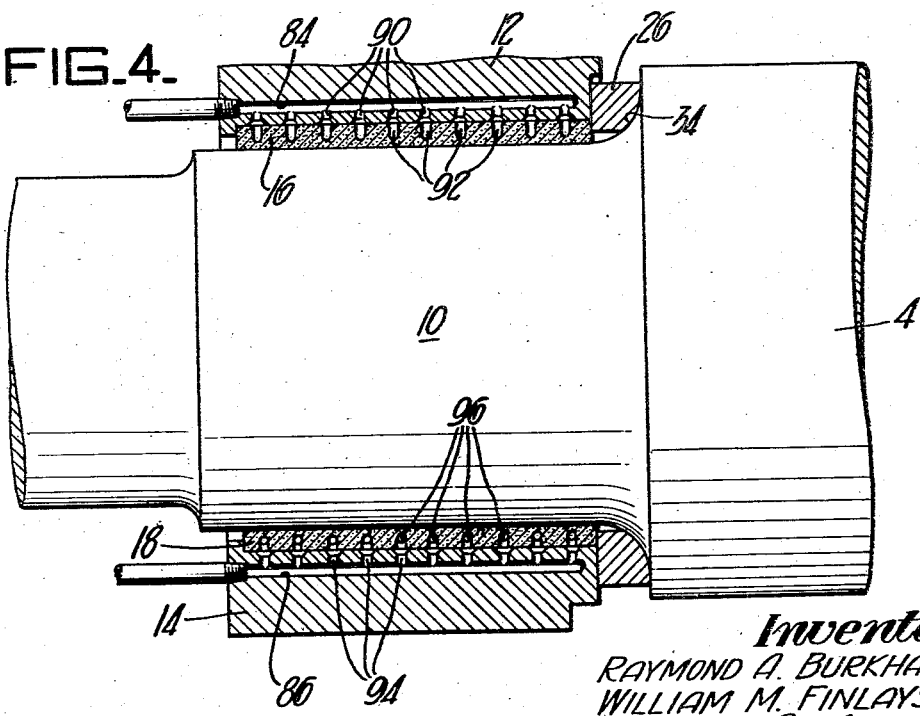

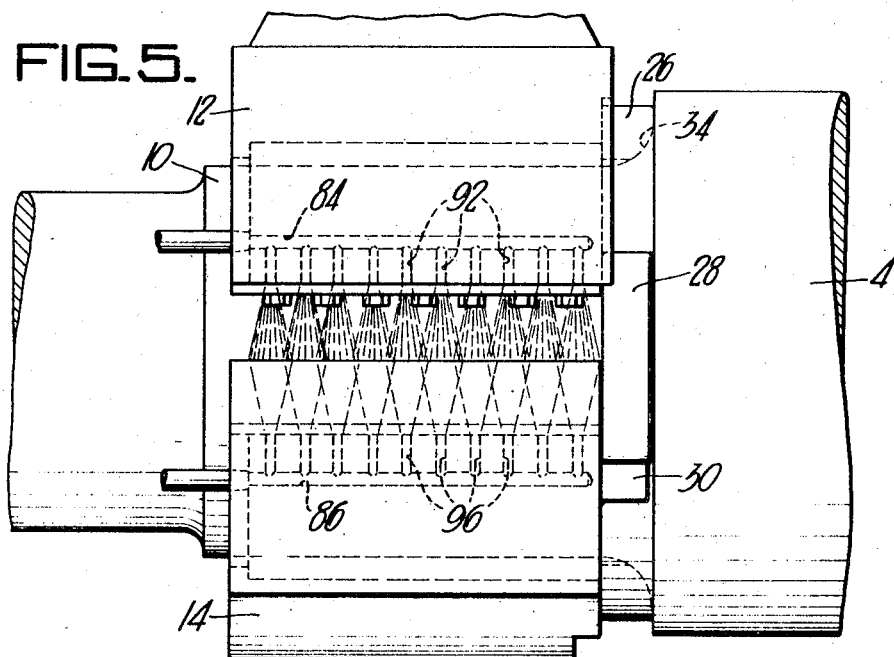
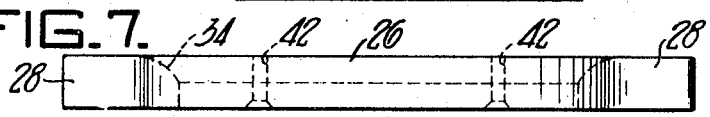
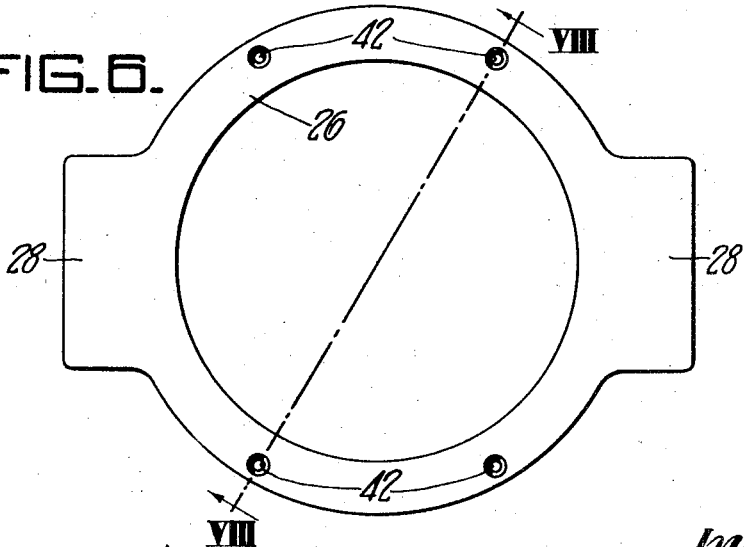
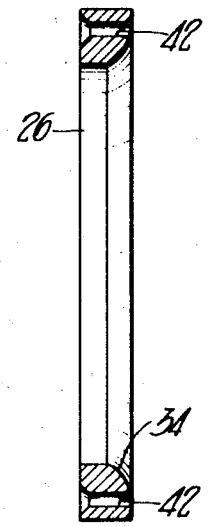
Inventors:
RAYMOND A. BURKHART and
WILLIAM M. FINLAYSON,
by John E. Jackson
their Attorney.

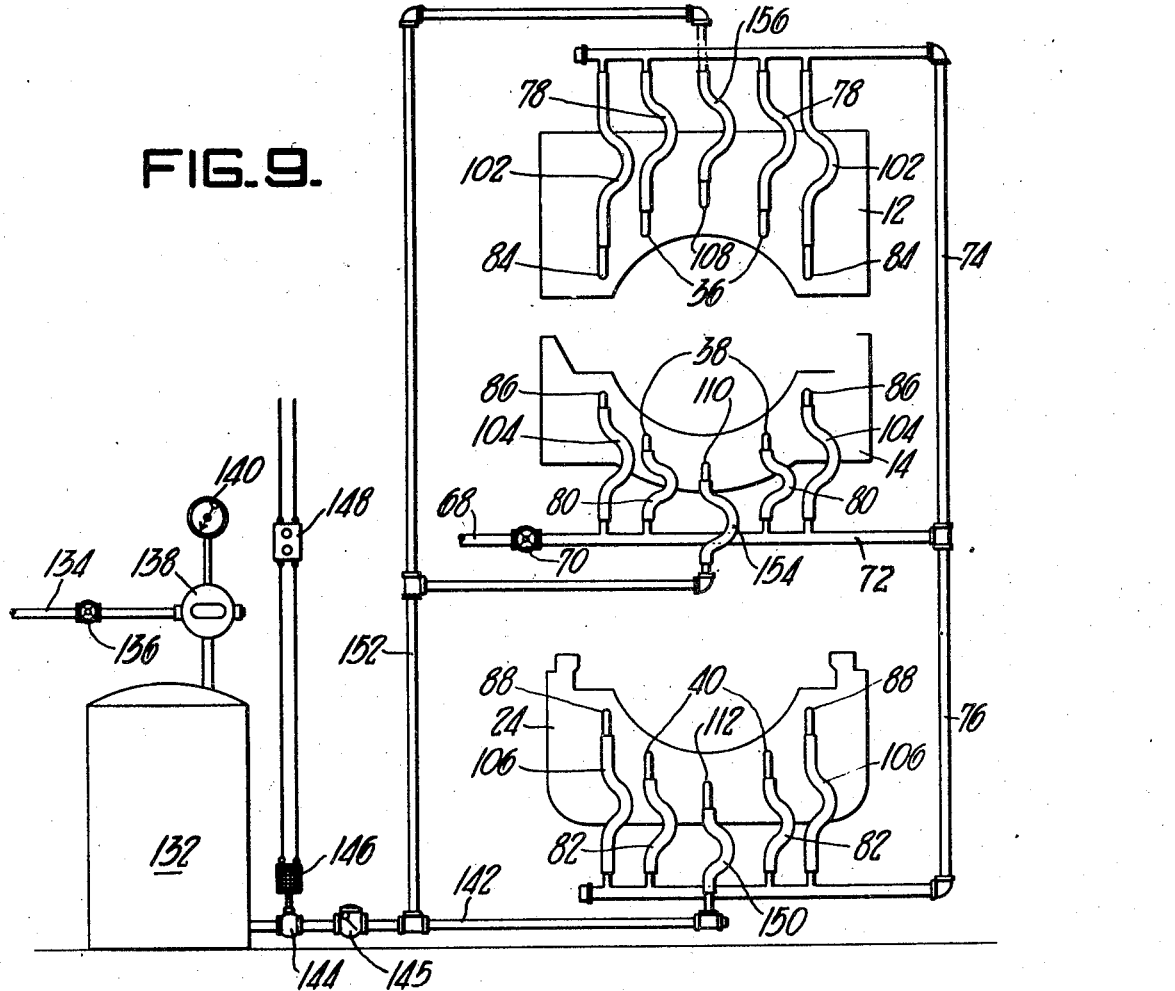

2,438,385

UNITED STATES PATENT OFFICE 2,438,385

METHOD AND APPARATUS FOR COOLING AND LUBRICATING BEARINGS

Raymond A. Burkhart and William M. Finlayson, Pittsburgh, Pa., assignors to Carnegie-Illinois Steel Corporation, a corporation of New Jersey Application July 7, 1945, Serial No. 603,612

14 Claims. (Cl. 308—123)

1

This invention relates to a method and apparatus for cooling and lubricating bearings.

The invention has among its objects the provision of an improved method of cooling and lubricating bearings whereby the life of the bearings is greatly lengthened.

The invention has as a further object the provision of improved apparatus for cooling and lubricating bearings characterized by its simplicity, its positiveness of operation, and its freedom from clogging and other similar causes of failure.

These and other objects of the invention will be more readily apparent in the following description.

The embodiment of the invention chosen to be described is that in which the bearings are employed in a rolling mill on the roll necks thereof, and the bearings are composed of a composition material, such as laminated fabric impregnated and bonded together with a phenol-formaldehyde resin. It is to be understood, however, that bearings cooled and lubricated in accordance with the invention are capable of other uses, and that the invention shows advantages in the cooling and lubricating of bearings composed of other materials. The invention, however, displays perhaps its maximum advantages in heavy duty apparatus employing composition bearings where the bearings are required to sustain high unit loads.

When composition bearings, such as above described, have been used in rolling mills on the necks of the rolls, the common cause of their failure has been the seizing or rapid wear between the thrust collars, bearing shells, roll journals, and faces. It has been a common practice to apply water for cooling and lubrication through an open line between the open spaces in the bearing portions and through a single opening in each bearing face. It has been found that water, when so introduced as a coolant and lubricant, does not give a film of sufficient tenacity in the various areas of the bearing to prevent seizing or rapid wear during the starting of the mill after a shut down, or during the operation thereof after the rolls have been brought up to normal speed. A further difficulty with the use of water as a lubricant and coolant is that the parts in contact with the water, such as the roll necks, tend to rust if the mill is out of operation for any appreciable time. The difficulties of such prior method of cooling are illustrated by experience on a 160" plate mill scale breaker employing water lubricated composition bearings. When such mill was operated in accordance with the prior art procedure employing water as a coolant or lubricant, the life of the bearings was such that only about 18,000 to 20,000 tons of steel could be processed in the mill before replacement of the bearings was necessary. Such short bearing life was obviously very undesirable, both because the bearings themselves were expensive and their replacement involved a substantial number of man-hours of labor, and because replacement of the bearings involves a substantial length of shut down of the mill with a consequent loss of steel production.

The present invention overcomes such difficulties in the cooling and lubricating of bearings with water by providing for the application of water under pressure between the shaft and the bearing at the point or points where the load is high and preferably where the load is at the maximum. In addition, before starting the shaft from rest in the bearing, and preferably also prior to shutting down the apparatus, a quantity of a water soluble oil is injected under pressure between the shaft and the bearing to provide a tenacious film of oil between the shaft and the bearing, and between other relatively movable parts to aid in the subsequent starting of the apparatus, and also to coat the bearing surfaces with oil to prevent them from rusting during the shut down period.

The invention will be more readily understood by reference to the accompanying drawings, in which:

Figure 1 is an end view, partially in section, of the portion of a two-high rolling mill stand at the roll necks, the section being taken along the line I—I in Figure 2;

Figure 2 is a view in vertical section through the roll bearings, the section being taken along the line II—II in Figure 1;

Figure 3 is a view in section through the axis in the upper roll, the section being taken along the line III—III in Figure 1;

Figure 4 is a view in section through the axis of the upper roll, the section being taken along the line IV—IV in Figure 1;

Figure 5 is a view in elevation of the upper roll bearing, the view being taken in the direction toward the left in Figure 1;

Figure 6 is a view in side elevation of the thrust collar employed on the upper roll;

Figure 7 is a view in plan of the thrust collar shown in Figure 6;

Figure 8 is a view in cross section through the thrust collar, the section being taken along the line VIII—VIII in Figure 6; and Figure 9 is a schematic view in side elevation of the oil and water supply means and the piping to the bearing chocks.

The rolling mill shown in the drawings for the purpose of illustrating a typical manner of use of the invention comprises a rolling mill housing 2 supporting in the conventional manner for rotation therein the upper working roll 4 and the lower working roll 6. The lower roll is relatively fixed vertically in the housing, adjustment of the spacing between the rolls being secured by the conventional screwdown 8 which selectively raises or lowers the upper roll. The upper roll is provided with a roll neck 10 having on the portion adjacent the working face of the roll a cylindrical bearing surface by which the roll is supported for rotation. The bearing means cooperating with roll neck 10 consists of a top bearing chock 12 and a lower bearing chock 14 having confronting faces provided with approximately semicylindrical shapes, as shown. A composition liner or bearing 16 is retained in the inner face of the top chock by gibs engaging the longitudinal edges thereof and the combination bearing 18 is similarly retained in the lower chock. Lower roll 6 is provided with a similar roll neck 20 having a cylindrical bearing surface thereon, the roll neck being supported in the composition bearing 22 which is retained in the lower bearing chock 24 by gibs engaging the edges thereof.

Both of the upper and lower rolls are provided with thrust collars mounted on the bearing assembly of each so as to be fixed against rotation. The upper thrust collar, designated 26, and the lower thrust collar 27 are shown more clearly in Figure 2. Each of the thrust collars has a shape similar to that shown in Figures 6, 7, and 8 which depict the upper thrust collar, there being oppositely projecting arms 28 on the upper thrust collar and similar arms 29 on the lower thrust collar, the upper thrust collar being held against rotation by engagement of the arms 28 with the lugs 30 on the lower chock 14 for the upper roll as shown in Figure 1, and the lower thrust collar being similarly held from rotation by engagement of its arms 29 with the lugs 32 on the chock 24. Each of the thrust collars is provided with a curved inner face typified by the face 34 on the thrust collar 26, said curved inner face rotatably engaging the end of the roll barrel and the curved junction between the roll barrel and the roll neck.

The lubricating water for each of the bearings is supplied under pressure between the rotating shaft or roll neck and the composition bearing at points of at least substantially maximum pressure imposed by the load. In the modification shown, the lubricating water is introduced into the bearings at points displaced 30° from either side of the vertical center line thereof, as shown in Figure 1. It is to be understood, however, that in other applications such points of maximum pressure may be located in other positions circumferentially of the bearing. As shown in Figure 3, top chock 12 is provided with a longitudinal bore 36 therethrough parallel to the axis of the roll neck. The bottom chock 14 is provided with a similar bore 38, and the chock 22 for the lower roll has a similar bore 40 therethrough (see Figure 1). Such bores are connected to a source of water under pressure, such as water under available plant pressure, through means presently to be described.

The longitudinal bores 36 and 38 in the upper and lower chocks for the top roll communicate at the rear ends thereof with correspondingly located bores 42 in the top thrust collar, said bores being parallel to the axis of the thrust collar, thereby introducing the lubricating water directly to the bearing surface between the curved inner face of the thrust collar and the end of the roll barrel. To insure delivery of water to bores 42 in the event of a slight rotative movement of the collar the ends of the bores 42 adjacent the rear ends of the bores 36 and 38 are counterbored, as shown in Figure 3. The lower thrust collar 27 is supplied with lubricating water in a similar manner, with the exception that but two bores similar to bores 42 are provided therein, mating with bores 40 in the chock 24.

Lubricating water is introduced under pressure between the bearing and the roll neck in each instance by suitable radial bores in the chocks communicating with the longitudinal bores therein, said first radial bores in turn communicating with radial bores in the composition bearing and with a groove in the inner face thereof parallel with the axis of the roll neck. In the case of the top bearing portion for the upper roll the radial bores in the chock 12, shown in Figure 3, are designated 44, said radial bores communicating with the longitudinal groove 46 in the inner face of the chock, which in turn communicates with radial bores 48 in the composition bearing 16. The bearing is provided with a longitudinal groove 50 in the bearing face thereof at the inner ends of radial bores 48 to insure the uniform distribution of water from the bores to the bearing surface. The lower bearing for the upper roll neck is provided with a similar lubricating system, there being radial bores 52 in the chock 14 communicating with the longitudinal bore 38, a longitudinal groove 54 in the inner face of the chock 14, a series of spaced radial bores 56 in the composition bearing 18, and a longitudinal groove 58 in the inner face thereof. The bearing for the lower roll is provided with similar means for introducing water to the bearing surface, the radial bores communicating with longitudinal bore 40 in chock 22 is shown in Figure 1 being designated 60, the groove in the inner face thereof being shown at 62, the radial bores in the composition bearing 24 being designated 64, and the longitudinal groove in the face of the composition bearing 24 being shown at 66.

Water under pressure is delivered to bores 36, 38, and 40 in the bearing chocks by apparatus such as shown schematically in Figure 9. As there shown, water under pressure, such as water under the ordinarily available plant pressure, is introduced through main 68, valve 70, and pipe 72 from which it is led by means of flexible pipes 80 to the bores 38 in chock 14. Bores 36 in the upper chock are supplied with water through branch pipe 74 and flexible pipes 78, and bores 40 in the lower chock 24 are supplied through branch pipe 76 and flexible pipes 82.

Where the bearing in which the cooling and lubricating means of the present invention is employed is of the open type, with spaces between the bearing portions, and particularly where it is subjected to abrasive material such as mill scale, it is necessary to flush the shaft at the open surfaces between bearing parts to exclude such foreign material from the bearing surface. In addition, where the bearing is employed under such conditions that it is subjected to high unit loads, it is preferable to employ an additional means for cooling the bearing more thoroughly than is inherently accomplished by introduction of the lubricating material.

In the mill shown, such flushing and cooling means are provided by additional sets of longitudinal bores in each bearing casting each communicating with a series of angularly directed bores in the chock and the composition bearing so that there is provided a curtain of water roughly tangential to the surface of the rotating roll neck which flushes away foreign material and additionally cools the shaft. The longitudinal bores in the upper chock 12 are located on each side of the center adjacent the ends of the bearing, such bores being designated 84. Bores 86 in the bottom chock 14 are similarly located and the same is true of the longitudinal bores 88 in the chock 24 for the lower roll. As shown in Figures 1 and 4 a series of radial bores 90 is provided in the chock 12 communicating with the bore 84, said radial bores in turn communicating with the angular bores 92 in the composition bearing, said last named bores being directed downwardly and generally tangentially of the roll neck.

A series of radial bores 94 is provided in the bottom chock 14, said bores communicating with angular bores 96 in the composition bearing 18, said bores being likewise directed tangentially of the shaft but upwardly thereof. Similar means are provided on the chock for the lower roll, there being radial bores 98 in casting 24 connecting with longitudinal bores 88 and a series of angular bores 100 in the composition bearing 22, said bores likewise being directed upwardly tangentially of the shaft. The angular bores in the bearings in each instance are so spaced on each edge of the bearing as to form a substantially continuous curtain of flushing and cooling water, as shown in Figure 5.

The flushing and cooling water is likewise supplied under pressure, which may be at ordinary mill pressures, and is conveniently derived from the same source as the lubricating water. As shown in Figure 9 the bores 84 in chock 12 are connected to the branch pipe 74 by means of flexible pipes 102, the bores 86 in chock 14 are supplied with water from pipe 72 through flexible pipes 104, and the bores 88 in the lower chock 24 are supplied with flushing and cooling water from branch pipe 76 through flexible pipes 106.

Water soluble oil is introduced to the inner face between the shaft and the bearing, in the embodiment shown, by a series of radial bores through the chocks and composition bearings located at the crowns thereof. As shown in Figure 1, each of the chocks is provided with a longitudinally extending bore located on the vertical center line of the roll necks, the bore in the top chock 12 being designated 108, that in chock 14 being shown at 110, and that in the bottom chock 24 being designated 112. Connecting with longitudinal bore 108 is a centrally located radial bore 114 which communicates with a radial bore 116 in the composition bearing. The bearing is provided on its inner face with a longitudinal groove 118 which receives the oil and applies it uniformly throughout the extent of the bearing surface on the neck. Bore 110 similarly is connected to a radial bore 120 in the chock 14, which in turn leads to radial bore 122 in bearing 18 and to a longitudinal groove 124 in the face of the bearing. In the bottom chock 24 there is provided a radial bore 126 located centrally thereof which communicates with bore 112 and with the radial bore 128 through the bearing, which connects with the longitudinal groove 130 in the face of the bearing.

The water soluble oil is supplied under pressure to bores 108, 110, and 112 by the means shown in Figure 9. An oil tank 132 has a source of compressed air 134 connected to the top thereof through manually operable valve 136 and adjustable pressure reducing valve 138. A pressure gauge 140 is provided to indicate the air pressure to which the oil is subjected. An oil outlet pipe 142 is connected to the tank near the bottom thereof through the solenoid operated valve 144, the operating solenoid 146 for valve 144 being energized to open the valve by means of the push button switch 148. Also located in line 142 is a check valve 145 which insures that the lubricating and cooling water from the bearing does not enter the oil tank. Oil is supplied to the bottom chock 24 through pipe 142 and flexible tube 150, to chock 14 through branch pipe 152 and flexible tube 154, and to the top chock 12 through branch pipe 152 and flexible tube 156.

The apparatus for cooling and lubricating the bearing above described may be operated as follows:

In a typical operating cycle, prior to starting operations a quantity of water soluble oil at approximately thirty pounds per square inch pressure is forced into the bearings in order to provide a film of oil between the bearing faces and the roll necks. In this method of operation the oil is admitted for only a short interval of time and does not feed during routine rolling operations. The film of oil so provided to each bearing permits the easy starting of the mill. The mill is then started and is brought up to substantially normal operating speed, at which time the lubricating water supply at the available plant water pressure is admitted to the bearing by opening valve 70. The water for lubricating the bearings, which flows continuously during mill operations, enters the bearings at points of at least substantially maximum bearing load, and lubricates the bearings satisfactorily while the mill is running. At the same time the cooling and flushing water, also at available plant water pressure, is admitted to the bearings and by reason of its flow tangential to the surface of the roll necks it cools the necks efficiently and by the flushing action of the opposing nozzles prevents the mill scale from entering the bearing between the roll necks and the bearing surfaces. Prior to mill shut down, valve 70 is closed to stop the flow of lubricating, cooling, and flushing water to the bearings, and practically simultaneously switch 148 is actuated to open valve 144 and admit a quantity of water soluble oil to the bearings for a short interval of time until the rolls have at least slowed considerably in coming to a stop. This prevents the rusting of the roll necks during the shut down period, and facilitates starting of the mill upon resumption of rolling operations.

It is to be understood that the above method of operation of the bearing lubricating and cooling means is capable of considerable variation. The main requirements are that the water soluble oil be admitted to the bearing prior to its rotation and preferably before the introduction of water, and at the shut down the water soluble oil shall be the last material to be admitted to the bearing. The other factors are capable of variation, if desired. For instance, if a higher pressure of compressed air is employed, so that it at least substantially equals the water pressure at the bearing effective to oppose entry of the oil thereinto, the admission of oil and water to the bearing may substantially overlap, that is, on starting of the mill flow of the water soluble oil may continue an appreciable time after the initiation of the flow of lubricating water into the bearing; furthermore, at the shut down the water may be allowed to flow an appreciable time after the introduction of the water soluble oil into the bearing has begun.

Typical of water soluble oils which may be used in carrying out the present invention are oils of the naphthalate or sulphonate type.

Use of the method and apparatus for lubricating and cooling bearings in accordance with the present invention has proved greatly to lengthen the life of heavy duty bearings, particularly those of the composition type disclosed above, employed on rolling mills. As an example the average life of composition bearings on a 160" plate mill scale breaker was, as disclosed above, only between 18,000 and 20,000 tons of steel rolled when they were lubricated and cooled in accordance with the described prior practice. In contrast thereto, a set of bearings having the same structure as those used in accordance with prior practice, but with the added oil and water ducts necessary to employ the present invention, operated in accordance with the preferred method described above, have up to the present time shown a bearing life of 146,955 tons, or an increase in tonnage of over 700% over prior practice. Such bearings are still functioning satisfactorily, and, on the basis of observations made so far, it is estimated that they should permit the rolling of over 300,000 tons of steel before they will require replacement. This will represent an increase of over 1500% over similar bearings not lubricated or cooled in accordance with the present invention.

While we have shown and described specific embodiments of the method and apparatus of our invention, it will be understood that we do not wish to be limited thereto, since various modification may be made without departing from the scope of the following claims. We therefore wish to claim as new the following.

We claim:

1. The method of lubricating relatively movable bearing surfaces which comprises injecting water soluble oil between the bearing surfaces prior to initial relative movement of the surfaces, after the surfaces have been brought up to substantial speed relative to each other injecting lubricating water between the bearing surfaces, and continuing the injection of lubricating water during substantially the full remaining period of relative movement of the bearing surfaces.

2. The method of lubricating relatively movable bearing surfaces which comprises injecting water soluble oil between the bearing surfaces prior to initial relative movement of the surfaces, after the surfaces have been brought up to substantial speed relative to each other injecting lubricating water between the bearing surfaces, stopping the injection of the water soluble oil, and continuing the injection of lubricating water during substantially the full remaining period of relative movement of the bearing surfaces.

3. The method of lubricating relatively movable bearing surfaces which comprises injecting water soluble oil between the bearing surfaces prior to initial relative movement of the surfaces, after the surfaces have been brought up to substantial speed relative to each other injecting lubricating water between the bearing surfaces, stopping the injection of the water soluble oil, continuing the injection of lubricating water during substantially the full remaining period of relative movement of the bearing surfaces, and spraying water on to the outermost ends of the bearing surfaces to cool the surfaces and to prevent foreign substances from entering between the bearing surfaces.

4. The method of lubricating relatively movable bearing surfaces which comprises injecting water soluble oil between substantially all the bearing surfaces prior to initial relative movement of the surfaces, after the surfaces have been brought up to substantial speed relative to each other injecting lubricating water between substantially all the bearing surfaces, stopping the injection of the water soluble oil, continuing the injection of lubricating water during substantially the full remaining period of relative movement of the bearing surfaces, and immediately prior to stopping the relative movement between bearing surfaces injecting water soluble oil between substantially all the bearing surfaces.

5. The method of lubricating relatively movable bearing surfaces which comprises injecting water soluble oil between substantially all the bearing surfaces prior to initial relative movement of the surfaces, after the surfaces have been brought up to substantial speed relative to each other injecting lubricating water between substantially all the bearing surfaces, stopping the injection of the water soluble oil, continuing the injection of lubricating water during substantially the full remaining period of relative movement of the bearing surfaces, and immediately prior to stopping the relative movement between bearing surfaces stopping the injection of lubricating water and injecting water soluble oil between substantially all the bearing surfaces.

6. The method of lubricating a bearing which has load supporting contact with and at least partially encompasses a relatively rotating element which comprises injecting water soluble oil between the relatively movable surfaces adjacent the crown of the bearing prior to initial relative movement of the bearing, after the element has been brought up to substantial speed relative to the bearing injecting lubricating water between them at points of approximately maximum bearing load, and continuing the injection of lubricating water during substantially the full remaining period of relative movement of the bearing surfaces.

7. The method of lubricating a bearing which has load supporting contact with and at least partially encompasses a relatively rotating element which comprises injecting water soluble oil between the relatively movable surfaces adjacent the crown of the bearing prior to initial relative movement of the bearing, after the element has been brought up to substantial speed relative to the bearing injecting lubricating water between them at points of approximately maximum bearing load, stopping the injection of the water soluble oil, and continuing the injection of lubricating water during substantially the full remaining period of relative movement of the element and bearing.

8. The method of lubricating a bearing which has load supporting contact with and at least partially encompasses a relatively rotating element which comprises injecting water soluble oil between the relatively movable surfaces adjacent the crown of the bearing prior to initial relative movement of the bearing, after the element has been brought up to substantial speed relative to the bearing injecting lubricating water between them at points of approximately maximum bearing load, stopping the injection of the water soluble oil, continuing the injection of lubricating the full remaining period of relative movement of the element and bearing, and immediately prior to stopping the relative movement between the element and bearing injecting water soluble oil between the element and bearing.

9. The method of lubricating a bearing which has load supporting contact with and at least partially encompasses a relatively rotating element which comprises injecting water soluble oil between the relatively movable surfaces adjacent the crown of the bearing prior to initial relative movement of the bearing, after the element has been brought up to substantial speed relative to the bearing injecting lubricating water between them at points of approximately maximum bearing load, stopping the injection of the water soluble oil, continuing the injection of lubricating water during substantially the full remaining period of relative movement of the element and bearing, immediately prior to stopping the relative movement between the element and bearing stopping the injection of lubricating water and injecting water soluble oil between the element and the bearing, and continuing the injection of the water soluble oil until relative movement between the element and bearing has at least substantially stopped.

10. The method of lubricating a bearing which has load supporting contact with and at least partially encompasses a relatively rotating element which comprises injecting water soluble oil between the relatively movable surfaces adjacent the crown of the bearing prior to initial relative movement of the bearing, after the element has been brought up to substantial speed relative to the bearing injecting lubricating water between them at points of approximately maximum bearing load, stopping the injection of the water soluble oil, continuing the injection of lubricating water during substantially the full remaining period of relative movement of the element and bearing, immediately prior to stopping the relative movement between the element and bearing injecting water soluble oil between the element and bearing, and during relative rotation of the element and bearing spraying water on to the outermost ends of the bearing and the exposed bearing surfaces of the element to cool the surfaces and to prevent foreign substances from entering between the bearing and the element.

11. A bearing which partially encompasses a rotating shaft and has load bearing contact therewith, means for introducing lubricating water under pressure directly between the shaft and the bearing at a point of substantially maximum bearing pressure, means for introducing water soluble oil under pressure directly between the shaft and the bearing substantially at the crown of the bearing, and means for spraying water along the exposed surfaces of the rotating shaft substantially tangentially thereto and in a direction away from the bearing edges in the bearing area of the shaft, whereby the shaft and bearing are cooled and foreign substances are prevented from entering between the shaft and bearing.

12. A bearing which partially encompasses a rotating shaft and has load bearing contact therewith, said bearing comprising a bearing shell and a bearing lining therein, a series of generally radial holes through the lining at a locus of substantially maximum bearing load, a duct in the bearing shell communicating with said holes, means to introduce lubricating water under pressure to the duct and holes, a series of generally radial holes through the lining substantially at the crown of the bearing, a duct in the bearing shell communicating with such latter holes, means to introduce water soluble oil under pressure to the latter duct and holes, a series of holes at each edge of the lining directed substantially tangentially to the shaft, a duct in the bearing shell at each edge of the lining communicating with the last named holes, and means for introducing water under pressure to the last named ducts and holes, whereby the jets of water issuing from the outer ends of the last named holes cool the shaft and bearing and prevent foreign substances from entering between the shaft and bearing.

13. In a rolling mill having a roll housing and a roll therein, said roll having a barrel and roll necks of smaller diameter than the barrel, the improvement which comprises a bearing on each roll neck which partially encompasses the neck, said bearing comprising a bearing shell and a bearing lining therein, a thrust collar about each roll neck in contact with the corresponding end of the roll barrel, the throat collars being secured to their respective bearings so as to prevent substantial rotation therebetween, a series of generally radial holes through the bearing lining in each bearing at a locus of substantially maximum bearing load, a duct through each bearing shell communicating with said holes, a hole through each of the thrust collars communicating with the end of the roll barrel and with the rear end of a duct, means to introduce lubricating water under pressure to the ducts and thus to the roll necks and to each end of the roll barrel, a series of generally radial holes through the lining substantially at the crown of the bearing, a duct in the bearing shell communicating with such latter holes, means to introduce water soluble oil under pressure to the latter duct and holes, a series of holes at each edge of the lining directed substantially tangentially to the shaft, a duct in the bearing shell at each edge of the lining communicating with the last named holes, and means for introducing water under pressure to the last named ducts and holes, whereby the jets of water issuing from the outer ends of the last named holes cool the shaft and bearing and prevent foreign substances from entering between the shaft and bearing.

14. In a bearing, a mass of metal having a liner of reinforced hard-cured resin therein which at least partially encompasses a rotating shaft and has load-bearing contact therewith, the improvement comprising means for introducing lubricating water under pressure directly between the shaft and the liner at a point of substantially maximum bearing pressure, and means for introducing water-soluble oil under pressure directly between the shaft and the liner substantially at the crown of the bearing.

RAYMOND A. BURKHART.
WILLIAM M. FINLAYSON.

REFERENCES CITED

The following references are of record in the file of this patent:

UNITED STATES PATENTS

| Number | Name | Date |
|---|---|---|
| 1,920,012 | Good | July 25, 1933 |

Certificate of Correction

Patent No. 2,438,385.  March 23, 1948.

RAYMOND A. BURKHART ET AL.

It is hereby certified that errors appear in the printed specification of the above numbered patent requiring correction as follows: Column 3, line 15, for the word "combination" read *composition*; column 4, line 32, after the word "with" insert *a*; line 35, for "is shown" read *as shown*; column 7, lines 33 and 34, for "modification" read *modifications*; and that the said Letters Patent should be read with these corrections therein that the same may conform to the record of the case in the Patent Office.

Signed and sealed this 18th day of May, A. D. 1948.

[SEAL]

THOMAS F. MURPHY,
*Assistant Commissioner of Patents.*